Figure 1:
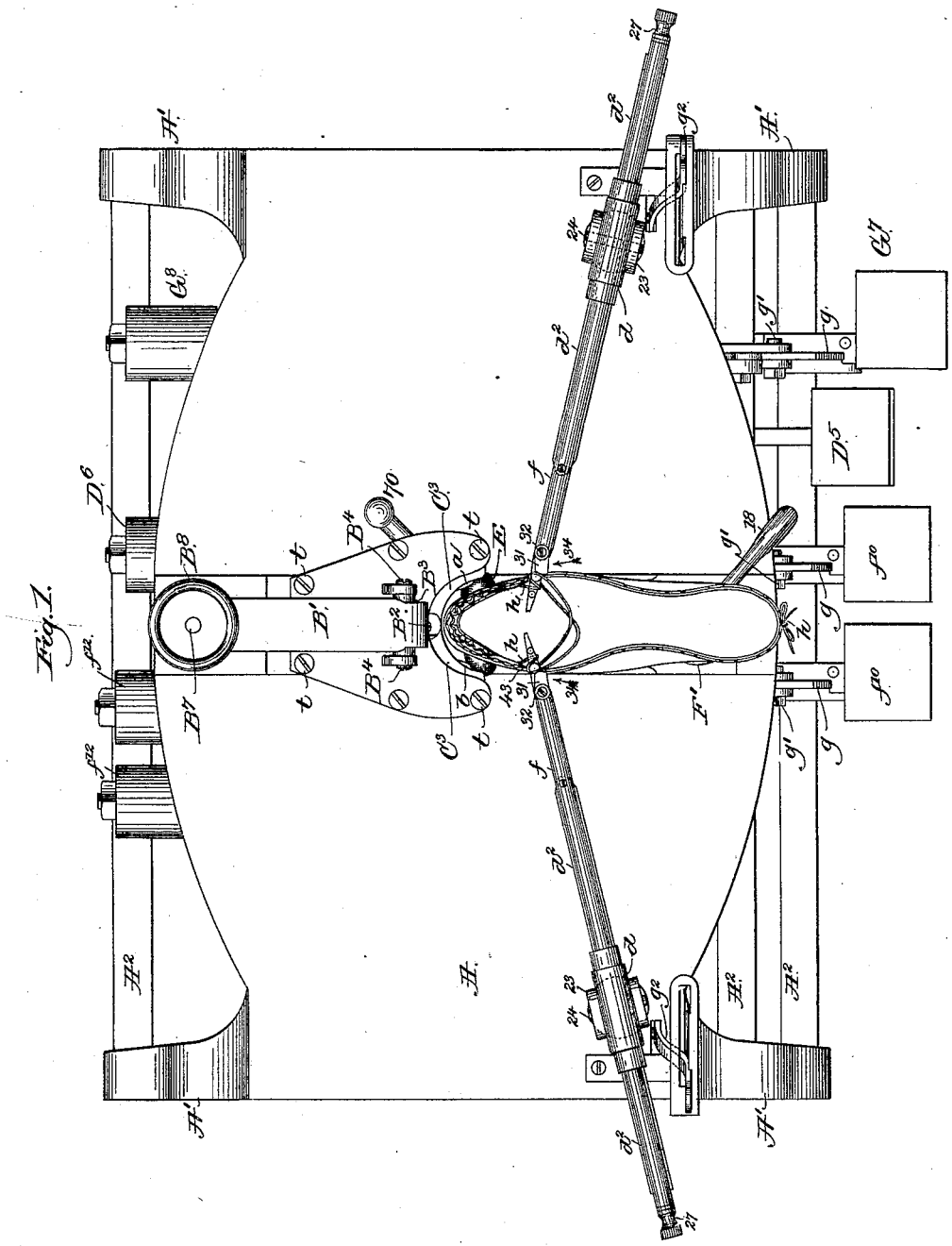

(No Model.) 5 Sheets—Sheet 1.

P. CUNNINGHAM.
LASTING MACHINE.

No. 424,861. Patented Apr. 1, 1890.

(No Model.) 5 Sheets—Sheet 2.

P. CUNNINGHAM.
LASTING MACHINE.

No. 424,861. Patented Apr. 1, 1890.

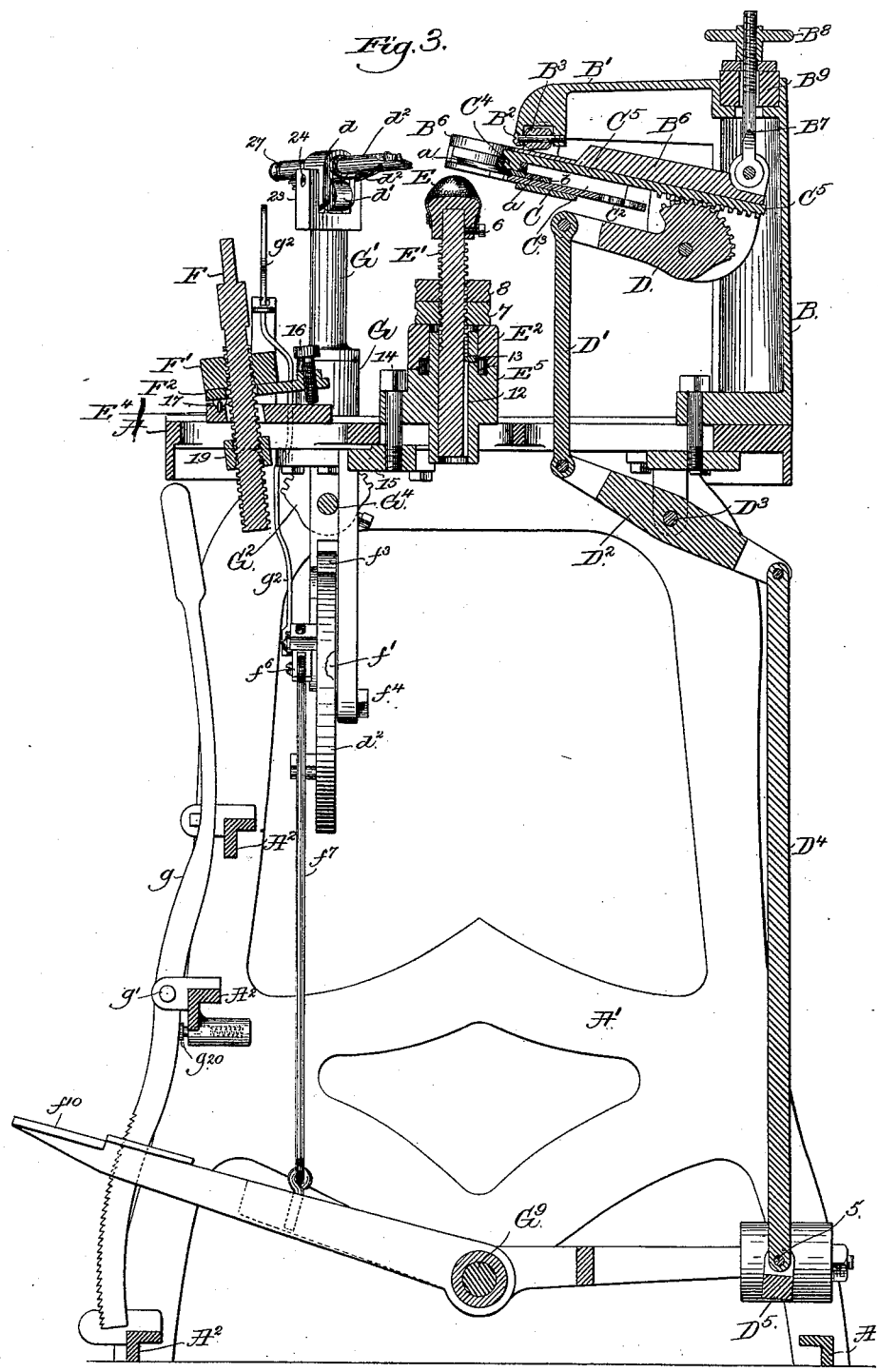

(No Model.) 5 Sheets—Sheet 4.
P. CUNNINGHAM.
LASTING MACHINE.
No. 424,861. Patented Apr. 1, 1890.
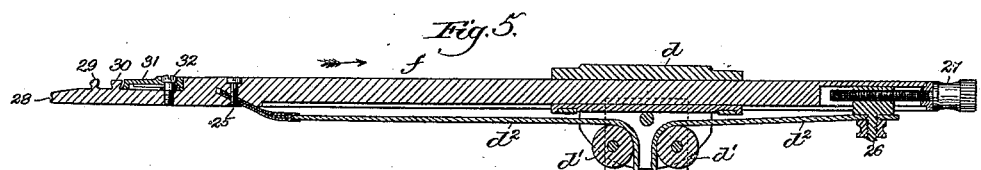
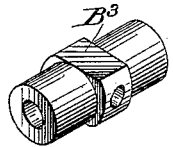
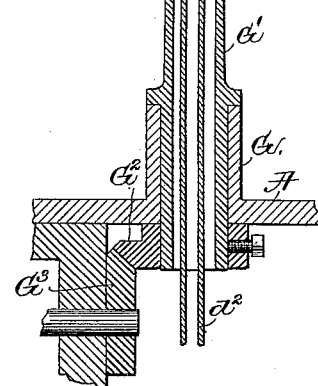
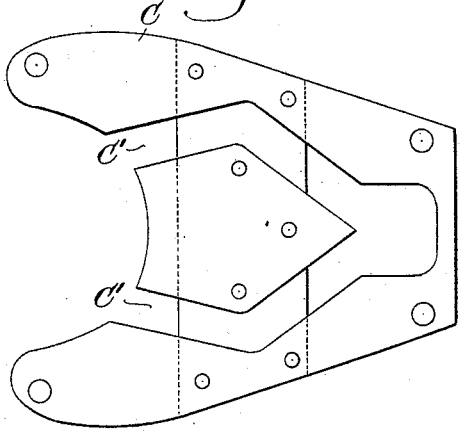
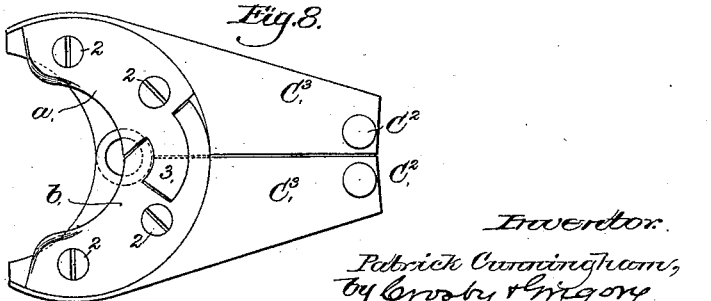

(No Model.) 5 Sheets—Sheet 5.

P. CUNNINGHAM.
LASTING MACHINE.

No. 424,861. Patented Apr. 1, 1890

Witnesses.
John F. C. Perinlott
Frederick L. Emery

Inventor:
Patrick Cunningham,
by Crosby & Gregory
attys.

UNITED STATES PATENT OFFICE.

PATRICK CUNNINGHAM, OF NEW BEDFORD, MASSACHUSETTS, ASSIGNOR TO THE APPLEGATE BOOT AND SHOE LASTING COMPANY, OF PORTLAND, MAINE.

LASTING-MACHINE.

SPECIFICATION forming part of Letters Patent No. 424,861, dated April 1, 1890.

Application filed July 1, 1889. Serial No. 316,236. (No model.)

*To all whom it may concern:*

Be it known that I, PATRICK CUNNINGHAM, of New Bedford, county of Bristol, State of Massachusetts, have invented an Improvement in Lasting-Machines, of which the following description, in connection with the accompanying drawings, is a specification, like letters and figures on the drawings representing like parts.

This invention has for its object to improve that class of lasting-machines wherein the edges of the upper are drawn over upon the last by a cord or cords to avoid the use of tacks.

The invention herein contained is an improvement on that described in United States Patent No. 393,760. Herein the cords are shown as acted upon by cord-drawing devices shown as clamps at the ends of horizontal rods free to be slid longitudinally in bearings of an oscillating post, the sliding bars having combined with them mechanism whereby they may be moved longitudinally when the upper is being lasted at the instep of the shoe. I have herein shown the actuating devices for moving the said rods as adapted to move the said rods positively in both directions, so that the said rods when in engagement with the cords at the instep may be either pushed in the direction to cross the last or be moved laterally away from the last. When the clamps on the rods act to pull the cord to draw the edges of the upper along the toe and ball of the last over upon the inner sole, and when the said clamps and rods act to draw the edges of the upper over upon the inner sole at and about the heel part of the last the said rods are or may be swung in the direction of the length of the last by gearing in engagement with the said posts, the strain at such time on the cords being drawn being exerted by a treadle or equivalent lever under the control, preferably, of the foot of the operator.

To last the toe more smoothly and rapidly than can be done by the cord alone, I have provided the machine with a toe-jaw, which is advanced and made to act against the upper outside the toe of the last just as or after the slack in the draw-cord has been taken up by the movement of the rods referred to toward the heel of the last. The toe-jaws are free to slide in a jaw-holder mounted on a pivot arranged parallel to the length of the last, so that the said toe-jaws are free to tip to accommodate for any inequalities of thickness in stock, as well as to the style of the last. The jaw-holder is also pivoted to turn on suitable pivots or bearings arranged substantially at right angles to the length of the last, and the said holder at its rear end has combined with it an adjusting device, whereby the inclination of the said holder with relation to the bottom of the last may be changed at will, according to the pressure desired and the curvature of the last. The upper to be lasted is placed on a last, and the latter is mounted upon a vertically-adjustable heel-pin having means whereby it may also be tipped more or less from a vertical position, according to the shape of the last, and the fore part of the last is permitted to rest upon a toe-rest, which is also vertically adjustable as to height, and which also has combined with it means whereby the toe-rest may be quickly raised and lowered to enable a last to be quickly put into and taken from the machine. The heel-pin is made horizontally adjustable toward and from the toe-rest. The toe-jaws are moved forward and backward in the holder by means of a sector-lever controlled by a treadle actuated by the foot of the operator.

The particular features in which my invention consists will be hereinafter more fully described, and designated in the claims at the end of the specification.

Figure 2:
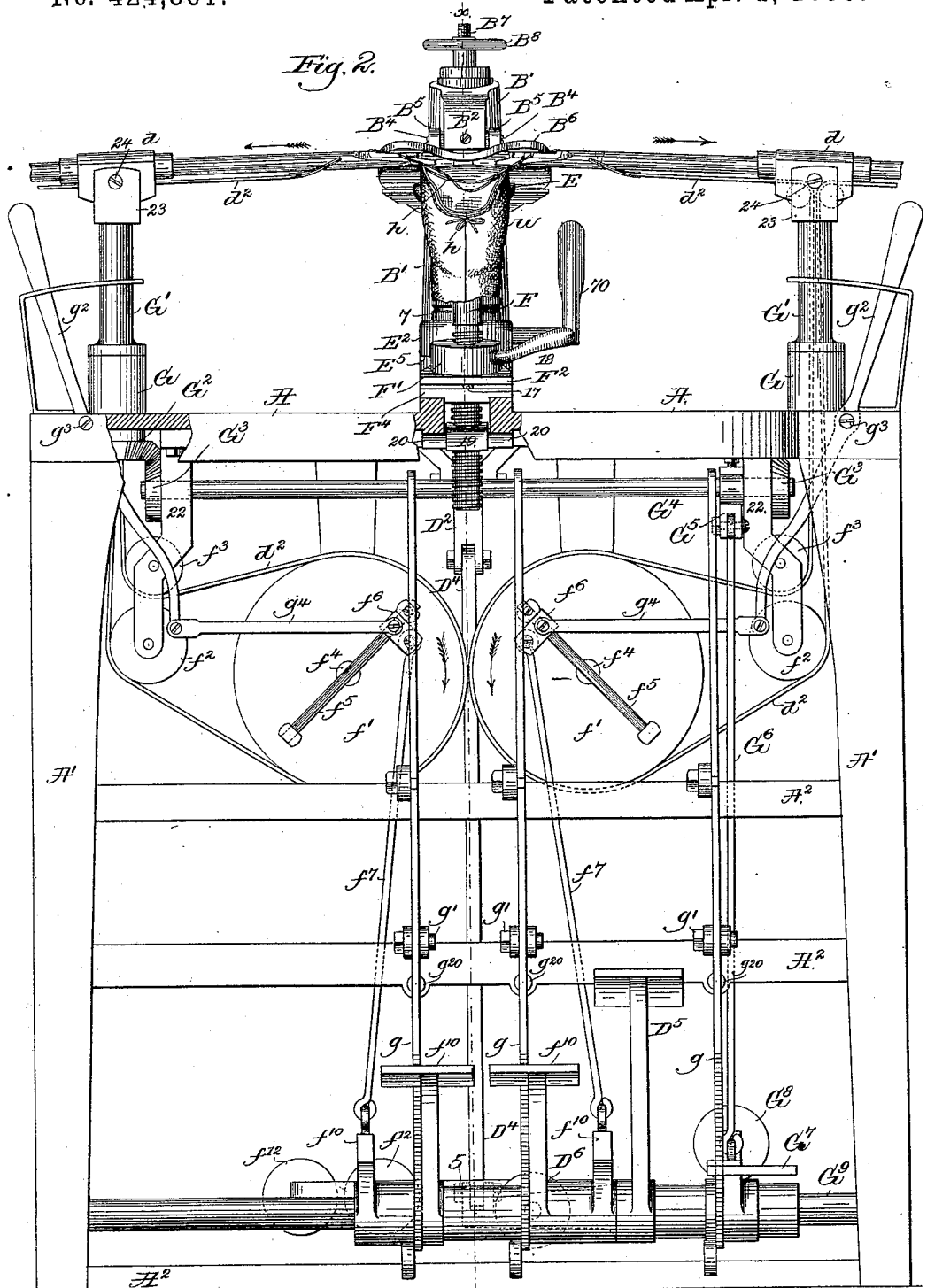
Figure 9:
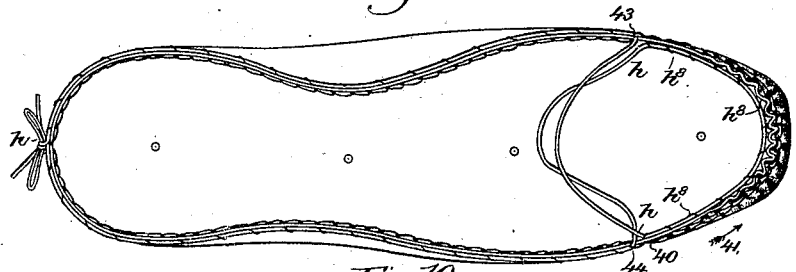
Figure 10:
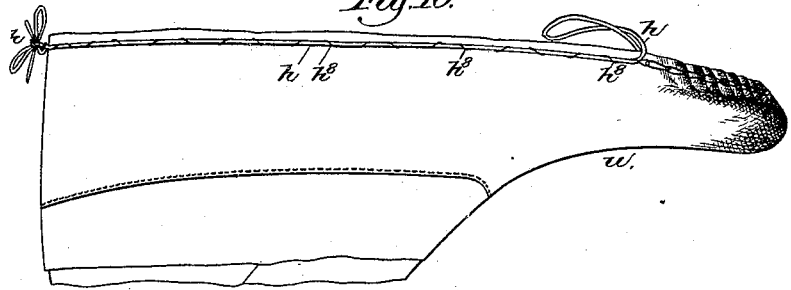
Figure 11:
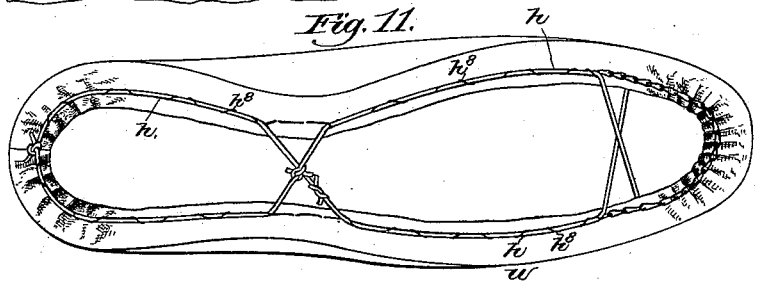
Figure 12:
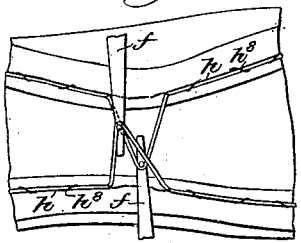

Figure 1 is a top or plan view of a lasting-machine embodying my invention; Fig. 2, a partial front elevation of the same; Fig. 3, a vertical section in the line $x\,x$, Fig. 2. Fig. 4 shows the rocker-pivot $B^3$; Fig. 5, a sectional detail of the cord-drawing rods and part of their actuating devices. Fig. 6 is a detail showing the under side of the little dog, which aids in holding the draw-cord; Fig. 7, a detail showing the cam-plate at the under side of the jaw-holder; Fig. 8, a detail showing the under side of the toe-jaws mounted on the toe-jaw carriers. Fig. 9 shows the shoe enlarged, with the draw-cord laid in the pockets composed of loops of needle-thread, the draw-cord being represented as having been pulled at and about the toe of the last; Fig. 10, a side elevation of the shoe shown in Fig. 9; Figs. 11 and 12, details to be referred to.

The frame-work of the machine consists of a table A, suitable side legs A', and cross-girts A² A².

The bed has erected upon it a stand B, having an overhanging arm B', the forward end of which receives a pivot-stud B² parallel to the length of the last, on which is pivoted a rocker-pivot B³, (shown separately in Fig. 4,) it receiving at its ends like pivot-screws B⁴, which pass through ears B⁵ of the jaw-holder B⁶, the said screws B⁴ forming pivots at right angles to the length of the last, the pivot B² permitting the said holder to tip and enable the jaws (to be described) to adapt themselves to varying thicknesses of stock and shapes of last bottom, while the pivots B⁴ permit the holder B⁶ to be adjusted more or less by or through the screw-threaded link B⁷ and the nut B⁸ to adapt the said jaws to the inclination of the last and the pressure required on the upper at the toe of the last. The link B⁷ and nut constitute an adjusting device for the holder B⁶. The link B⁷ is extended through a spring B⁹, of rubber or other material, to enable the jaws to give slightly and obviate tearing the leather.

The under side of the holder has attached to it by suitable screws $t$ a cam-plate C, having two cam-slots C' to receive the roller or other usual studs C² of the jaw-carrying lever C³, mounted to turn on a stud C⁴, extended downwardly from one end of a sliding rack-bar C⁵, the said carriers and rack-bar being located in the space between the said holder and its cam-plate, as best shown in Fig. 3.

The jaw-carriers have attached to them by suitable screws 2 2 the two jaws $a\ b$. The edges of these jaws which contact with the upper at the toe of the last are curved and are fitted together, so that the junction of their edges is substantially central with the pivot C⁴, on which the toe-jaw carriers turn as they are being moved forward by the sector-lever D, (to be described,) the said jaw-carriers being at the same time moved to partially close the jaws by the studs C² traveling in the cam-slots C'. By this construction the edges of the toe-jaws, which contact with the upper on the last at the center of the toe of the last, are located farther back than usual, so that after the edges of the toe-jaws have come in contact with the edge of the upper, the jaws being then open, the said edges, as the jaws are thereafter moved forward and closed simultaneously to wipe the edges over the inner sole, have given to them much less movement than were the acting edges of the jaws located ahead of the said pivot, as in jaws such as heretofore used, this less closing movement of the ends of the jaws in contact with the toe of the upper obviating bunching or crimping the upper immediately at the end of the toe of the last.

The end of the toe-jaw $a$ has a curved tongue 3, which enters a slot 4 in the jaw $b$, so that as the said jaws are closed there is not left a gap between them into which may enter the upper of the shoe being acted upon to thus form a crimp or leave a mark.

The operating mechanism for the sector-lever D is herein shown as a link D', jointed to it and to a lever D², pivoted at D³, and a second link D⁴, jointed by pin 5 to the inner end of a treadle D⁵, (see Figs. 1 and 2,) the depression of the said treadle by the foot of the operator causing the said rack-bar C⁵ to be moved forward, a weight, as D⁶, on the rear end of the said lever moving the treadle into the position shown in Fig. 1, whenever the operator removes his foot from the treadle, thus retracting the said slide-bar and jaws.

The toe-rest is composed of a suitable concaved pad E, attached to the upper end of a screw-rod E', provided with an adjusting-nut 7 and a set-nut 8, the said nut 7 resting upon the top of a cam-block E², having cams or inclines at its under side and resting loosely on a hub E⁵, having cams or inclines at its top. The cam-block has a handle 70, by which it may be turned quickly when it is desired to raise or lower the toe-rest to clamp a shoe and last, or to release the same, the adjustment of the nuts 7 8 placing the toe-rest at the proper height to receive the last when the cam-block E² is turned to let the toe-rest down. The lower end of the toe-rest rod E' is grooved, as at 12, to receive a projection or screw 13, the latter preventing the rotation of the said rod, yet permitting the said rod to be easily lifted from the cam-block. The cam-hub E⁵ is adjustably secured to the table by a bolt 14 entering a nut 15.

The heel-pin F is shown as a screw-threaded rod entering a nut F', having a handle 18, and resting upon a tipping plate F², provided at one side of the said rod with an adjusting device 16, (shown as a screw,) the said tipping plate having its fulcrum at 17 upon a sliding carriage E⁴, resting on the table A. The heel-pin F is extended loosely through the said carriage, and below the table is provided with a nut 19, having ears 20 at each side, (see Fig. 2,) where the front of the table is broken out, which ears, as the nut F' is turned partially around on the quick threads of the heel-pin, raises the heel-pin and brings the said ears 20 against the under side of the table, thus locking the carriage and heel-pin in place at the proper distance from the toe-rest, according to the length of the last. Movement of the adjusting device 16 will change the inclination of the plate F², and thus tip the heel-pin more or less, as required, to enable the heel-pin to correctly hold the lasts notwithstanding variations in the holes in the lasts for the reception of the heel-pin.

The table A has like tubular bosses G, which receive the shanks of tubular posts G', provided at their lower ends below the said table with gears $G^2$, which are engaged by bevel-gears $G^3$, fast on a rock-shaft $G^4$, held loosely in suitable bearings in hangers 22, depending from the table, the said rock-shaft having an arm $G^5$, to which is connected a hub $G^6$, attached to a treadle $G^7$, mounted to turn on a rod $G^9$, the opposite end of the said treadle having an adjustable weight $G^8$. The top of each tubular post $G'$, which, as described, may be partially rotated when desired, has a forked head 23, in which by a suitable pivot-pin 24 is pivoted a sleeve $d$ having, as shown, two rolls $d'$ $d'$, over which is extended a suitable cord, strap, or belt $d^2$, one end of the said cord, as herein shown, being attached to a cord-drawing rod $f$ by a screw 25, the opposite end of the said cord being attached (see Fig. 5) to a nut 26, made adjustable on the said rod by an adjusting-screw 27. The said cords between their ends pass each over a like pulley $f'$, and like guide-pulleys $f^2$ $f^3$, herein shown as turning on the said hangers 22. As the pulleys $f$ are rotated partially, they actuate the said cords and cause the longitudinal movement of the said rods $f$. These pulleys turn on like pivots $f^4$, and each pulley, as herein shown, has suitable lugs to receive and hold a rod $f^5$, on which is a block $f^6$, having a pin, which is engaged by a rod $f^7$, each rod $f^7$ being jointed to the rear ends of like treadles $f^{10}$, mounted loosely on the rod $G^9$ and weighted at $f^{12}$. The outer ends of these two treadles are (see Fig. 1) placed sufficiently close together to enable the operator to depress both of them by one foot and at a simultaneous operation, if desired.

Each treadle $G^7$ and $f^{10}$ has co-operating with it a like ratchet or holding lever $g$, pivoted at $g'$ and acted upon by a spring-pressed plunger $g^{20}$, (see Fig. 3,) which normally acts to keep the ratchet-toothed ends of the said holding-levers pressed outwardly, as in Fig. 3, ready to engage projections of and hold the outer ends of the said treadles down in the position in which they are left by the foot of the operator; but the operator by engaging the upper ends of the said levers may readily move them to free the treadles and let the weights attached to their opposite ends act to elevate the front ends of the treadles.

Viewing Fig. 2, with the blocks $f^6$ upon the rods $f^5$ in the position therein shown, the pulleys $f'$ when operated by the depression of the treadles $f^{10}$ will be rotated in the direction of the arrows thereon, and the draw-cord rods $f$ will be moved in the direction of the arrow thereon in Figs. 2 and 5, the catches (to be described) connected with the said rods being supposed to be attached at the draw-cords.

If for any reason, as sometimes happens, because of the breakage of a draw-cord, it should be desired to move the draw-cord rods in the opposite direction or so as to start and traverse across the last rather than to move away from it, then the operator by engaging the levers $g^2$, pivoted at $g^3$, will, through the link $g^4$, connected to the blocks $f^6$, cause the said blocks to be slid on the rods $f^5$ to the opposite side of the centers $f^4$ of the pulleys $f'$, and thereafter by the depression of the treadles $f^{10}$ the pulleys $f'$ will be moved partially in the direction opposite the arrows thereon. The front end of each draw-cord rod will preferably contain a notch, as 28, (see Fig. 5,) to enable it to hold upon a draw-cord, and so, also, the said draw-cord rods near their ends will be provided with one or more projections, as 29 30, and to aid in better holding the draw-cord with small dogs 31, pivoted at 32, as shown best in Fig. 5, each of the said dogs being provided at its under side with a spring, as 33, so connected with the said dog and with the said rod as to normally turn the dog in the direction of the arrow 34. (See Fig. 1.)

From the foregoing description it will be understood that the draw-cord rods may be swung backward and forward about a vertical pivot, that they may also be turned up and down about their pivots 24, and that they may also be moved longitudinally in the sleeves $d$.

Referring to Fig. 9, it will be noticed that the draw-cord $h$ is contained in small pockets, (shown as composed of parts of loops $h^8$ of thread inserted by a sewing-machine,) the said draw-cord, as herein represented, being supposed to be laid upon the upper under the descending needle, so that the needle-thread crosses the draw-cord at intervals of two, three, or more stitches. In introducing this draw-cord into the pockets of loops I prefer to start at the heel-seam with the outside of the upper uppermost on the bed-plate of the sewing-machine and insert the said stitches, laying the draw-cord under them by a suitable finger, much after the manner of an embroidery device, until the stitching arrives near the toe or the toe-cap, as at 43, when the stitching will be stopped and the upper will be turned over, so that the inner side of the upper will be uppermost, and then the stitching will be commenced at the opposite side of the upper, as at 40, and will continue about the toe in the direction of the arrow 41 until the stitching arrives at the point 43, where the stitching was left off to enable the draw-cord to be carried to the opposite side of the upper. On arriving at the point 43 again the machine will be again stopped, the upper, turned over, so that its outer side is again uppermost, and then the stitching will be commenced on the opposite side of the upper, or at the point 44, and will continue along the upper to the end of the heel, where the said draw-cord will be cut off, and its two ends having suitable slack will be united or tied together at the heel.

In Fig. 1 the upper therein represented is supposed to have been provided with a draw-cord in the manner described, and enough slack was left in the draw-cords extending across the ball of the inner sole and last to enable each half of the draw-cord to be caught by the projections 29 30 and the dog 31, as shown in the said Fig. 1. In this condition of affairs the operator will examine the upper and lining at the toe of the last to see if they are in proper condition, and if not with his fingers or otherwise he will smooth them, and thereafter he will put his foot upon the treadle $G^7$ and depress it far enough to swing the draw-cord rods horizontally back toward the heel of the shoe for a distance sufficient to take up all the slack in the draw-cord extending from the said rods about the toe of the upper, which slack having been taken up the holding-lever $g$, co-operating with the said treadle $G^7$, is made to catch and detain it in its depressed position. The operator then examines the toe of the upper and sees if it has been properly gathered, and thereafter the operator with his foot upon the treadle $d^5$ causes the toe-jaws to be moved forward until their edges meet the upper at the toe of the last, the forward movement of the toe-jaws being continued, the jaws at the same time being slowly closed until the toe-jaws by an inward motion have wiped the upper smoothly over upon the toe of the inner sole, and thereafter the holding-lever $g$, which acted to hold the treadle $G^7$, is released, permitting the weight $G^8$ to turn the draw-cord rods back into their original position, when the operator will detach or loosen them from the projections and dogs referred to. While the toe-jaws yet hold the upper upon the last the operator takes hold of the draw-cords, which were knotted together at the heel of the upper, and by a strong pull exerted by his hands takes up the slack in the draw-cord previously made by the described movement of the draw-cord rods, and again ties or fastens the ends of the draw-cord at the heel. This done, the operator will again bring the rods in position to engage the draw-cord, but this time at or near the instep of the upper at both sides thereof, and if the cord is to be pulled it will be made to engage with the projections 29 30, the draw-cord rod at one side of the last or upper engaging the draw-cord at the opposite side of the last or upper which done the operator by depressing both treadles $f^{10}$, as described, will, through the mechanism set in motion by them, move the two draw-cord rods in the direction of the arrows thereon in Figs. 2 and 5, and pulling the said draw-cords, as represented in the detail Fig. 12, or until all slack in the draw-cord has been taken up. This pulling of the draw-cord is in the proper direction to not only cause the edges of the upper to be pulled over the edge of the inner sole, but also to cause the upper to be fitted snugly to the last. This done, the loops of the draw-cord shown in Fig. 12, as last made, will be disengaged from the draw-cord rods, and will be cut and tied together from side to side, as represented in the detail Fig. 11. This completes the lasting of the upper, and the toe-jaws will be released and the cam-block $E^2$ turned to lower the toe-rest, and the nut $F'$ be turned to release the heel-pin, leaving the last in condition to be readily removed. In case of the breakage of the draw-cord, so that there is not sufficient amount thereof to be pulled in the direction stated at the instep, then the operator may, while the said cord is properly tied together, place the end notch 28 of a draw-cord rod against the draw-cord, each rod against the draw-cord at that side of the shoe next to it, and will move the levers $g^2$ to carry the blocks $f^6$ to the opposite ends of the rods $f^5$, and thereafter by the depression of the treadles $f^{10}$ the rods $f$ will be pushed in a direction opposite the arrows thereon in Figs. 2 and 5, and will take up the slack in the draw-cord and fit the upper to the instep of the last.

The particular method herein described of inserting the draw-cord and carrying it from one to the other end of the edge has been made the subject-matter of another application, Serial No. 316,743, to which reference may be had.

By the employment of the draw-cord rods, as described, the operator may engage the said rods in his hand as they are being moved by the treadle, and may assist in their movement or may retard their movement as the exigencies of the upper or of the cord demand, the fact of having the draw-cord rods in his hands enabling him to better last the toe and other parts of the upper than can be done with the devices which act upon the draw-cords flexibly, as in the patent referred to.

I have herein described and illustrated the draw-cord as applied in a certain way; but I do not desire to limit my invention to the exact construction of the pockets of thread-loops in which I have introduced the said draw-cord, nor to the particular direction taken by the draw-cord in its passage about the upper from heel to toe, as I may insert the draw-cord in any other usual or well-known manner and yet my improved devices for pulling the said draw-cord be operated to great advantage.

I claim—

1. In a lasting-machine, means to support the last having the upper thereon to be lasted and draw-cord rods located at opposite sides of the last and having devices to engage the draw-cord, as described, combined with sleeves and oscillating posts to support the said draw-cord rods, substantially as described.

2. In a lasting-machine, means to support the last having the upper thereon to be lasted and draw-cord rods having devices to engage the draw-cord, as described, combined with sleeves and oscillating posts to support the said draw-cord rods, and with cords or straps and actuating mechanism therefor to reciprocate the said draw-cord rods in the direction of their length, substantially as described.

3. In a lasting-machine, means to hold the last containing the shoe-upper to be lasted and draw-cord rods having devices, substantially as described, to engage the draw-cords, combined with toe-jaws and means to engage them to wipe the edges of the upper over upon the toe of the last after the draw-cords have been drawn upon to gather the toe of the upper upon the toe of the inner sole, substantially as described.

4. In a lasting-machine, means to support the last having thereon the upper to be lasted, a tipping holder, a sliding bar, and toe-carriers having attached toe-jaws, combined with a sector-lever and a treadle, and means to connect them, whereby the operator with his foot on the treadle may actuate the said toe-jaws to operate substantially as described.

5. In a lasting-machine, the standard B B', the holder $D^6$, pivoted with relation thereto, so as to tip in the direction of its length and width, a cam-plate C, carried by the said holder, and jaw-carriers and jaws $a$ $b$, connected thereto, and a sliding bar $C^5$, combined with an adjusting device to adjust the said holder to the shape of the last and the pressure required, substantially as described.

6. In a lasting-machine, the pivoted holder $B^6$, the attached cam-plate, the sliding bar $C^5$, the jaw-carriers pivoted thereon and provided with jaws $a$ $b$, and means for reciprocating the said bar $C^5$ and for adjusting the said holder to the shape of the last, combined with a yielding spring, as $b^9$, to operate substantially as described.

7. In a lasting-machine, pivoted jaw-carriers and means to move the said carriers longitudinally and to turn them about their pivot, combined with jaws, as $a$ $b$, having their meeting ends substantially at the center, about which the said jaw-carriers turn in their closing movement, to operate substantially as described.

8. In a lasting-machine, pivoted jaw-carriers and means to move the said carriers longitudinally and to turn them about their pivot, combined with jaws, as $a$ $b$, having their meeting ends substantially at the center, about which the said jaw-carriers turn in their closing movement, the said jaws being provided the one with a projection, as 3, to enter a slot in the other, to operate substantially as described.

9. In a lasting-machine, two draw-cord rods, as $f$ $f$, pivoted sleeves in which they are mounted to reciprocate, vertically arranged oscillating posts, as G, upon which the said sleeves are mounted, a rock-shaft and a treadle, and connections between it and the said rock-shaft, combined with gearing between the said rock-shaft and the said oscillating posts to actuate the same simultaneously, substantially as described.

10. In a lasting-machine, the draw-cord rods, their supports, the cords connected to the said rods, the pulleys $f'$, having the guides $f^5$, the blocks $f^6$, movable thereon, and means to move the said blocks on the said guides, combined with treadles connected to the said blocks to partially rotate the said pulleys, substantially as described.

11. In a lasting-machine, the heel-pin having a threaded shank, the nut F' thereon, the adjustable plate $F^2$, on which the said nut rests, and a movable carriage to support the said plate, combined with a nut, as 19, upon the said heel-pin below the said carriage, whereby rotation of the said nut F' is made to secure the carriage and the heel-pin rigidly in place, substantially as described.

12. In a lasting-machine, a toe-rest consisting essentially of a threaded rod having a longitudinal slot 12, a nut 7, and a cam-block on which the latter rests, combined with a projection to enter the said slot 12 and prevent the rotation of the toe-rest, yet permit it to be readily removed from the cam-block, substantially as described.

In testimony whereof I have signed my name to this specification in the presence of two subscribing witnesses.

PATRICK CUNNINGHAM.

Witnesses:
J. L. GILLINGHAM,
FREDERICK L. EMERY.